United States Patent Office 3,284,533
Patented Nov. 8, 1966

3,284,533
PROCESS FOR THE MANUFACTURE OF ISOPRENE AND ISOBUTENE
Akio Mitsutani, Takarazuka, Japan, assignor to Kurashiki Rayon Company Limited, Sakazu, Kurashiki, Japan
No Drawing. Filed Feb. 26, 1965, Ser. No. 435,731
Claims priority, application Japan, Mar. 7, 1964, 39/12,528
5 Claims. (Cl. 260—681)

This invention relates to a process for the manufacture of isoprene and isobutene by decomposing catalytically 4,4-dimethylmetadioxane in the presence of steam and tertiary butanol.

It has been well known that when 4,4-dimethylmetadioxane is decomposed catalytically isoprene is produced as the main product when suitable catalysts are used, and in cases where catalysts having strong acidity are used, isobutene is produced as the main product. It has been also well known that isobutene is by-produced with the selectivity of about 5–7% even when a catalyst which gives isoprene in a high yield of about 90% is used.

The inventor has found that when tertiary butanol, which is always by-produced in the amount of at least 7% referred to the 4,4-dimethylmetadioxane in manufacturing 4,4-dimethylmetadioxane by the reaction of isobutene with formaldehyde, is introduced together with 4,4-dimethylmetadioxane into the catalytic decomposition apparatus for 4,4-dimethylmetadioxane and decomposed catalytically in the presence of steam, isoprene may be synthesized at higher yield preventing the conversion of 4,4-dimethylmetadioxane into isobutene and at the same time isobutene may be recovered by causing the dehydration of tertiary butanol. This makes it possible to yield isoprene at a high yield from 4,4-dimethylmetadioxane and at the same time to recover tertiary butanol, which is by-produced in the synthesis of 4,4-dimethylmetadioxane, in the form of isobutene as starting material, and has the advantage of reducing the cost of isoprene industrially.

The invention is based on the idea as mentioned above and is a process for the manufacture of isoprene and isobutene simultaneously by decomposing catalytically 4,4-dimethylmetadioxane in the presence of steam, characterized by introducing tertiary butanol together with 4,4-dimethylmetadioxane onto a catalyst to perform the catalytic decomposition of 4,4-dimethylmetadioxane simultaneously with the dehydration of tertiary butanol.

As catalysts which may be used in the process according to the invention, there are generally suitable catalysts which may be used for the catalytic decomposition of 4,4-dimethylmetadioxane into isoprene, such as phosphoric acid supported on diatomaceous earth, silica gel, quartz sand, other metal oxides and a mixture thereof, a phosphoric acid-carrying catalyst treated at a high temperature above 700° C., phosphates, metal oxides, metal sulfates and the like. For the catalyst in the reactor, any form of catalyst such as fixed bed, moving bed or fluidized bed may be used.

The reaction temperature between 150° C. and 400° C. is suitable and the pressure may be either reduced or atmospheric pressure or a pressure within the range in which the starting material is in a gaseous state at the reaction temperature.

The reaction is carried out in the presence of steam and the suitable molar ratio of steam to 4,4-dimethylmetadioxane is 2–20. Tertiary butanol may be used at the proportion not exceeding 1–70% based on 4,4-dimethylmetadioxane. To introduce 4,4-dimethylmetadioxane together with tertiary butanol into the catalytic decomposition apparatus, the tertiary butanol by-produced in synthesizing 4,4-dimethylmetadioxane may be introduced into the reactor without separating it from 4,4-dimethylmetadioxane, or after separating 4,4-dimethylmetadioxane from tertiary butanol they again together may be introduced into the reactor. Isoprene may be separated from the reaction product in a conventional method and isobutene may be recovered.

The invention includes also the reaction in the presence of monoalcohol and glycol such as isoprene glycol and isopropenyl ethyl alcohol and other alkyl metadioxane of below 5% based on 4,4-dimethylmetadioxane besides 4,4-dimethylmetadioxane and tertiary butanol.

Example 1

10 ml. of commercial solid phosphoric acid catalyst treated at 1,100° C. for 16 hours was filled in an iron reaction tube in a silicon oil bath and the catalytic decomposition of 4,4-dimethylmetadioxane was carried out at a reaction temperature of 200° C. in the presence of tertiary butanol.

The flow rate of metadioxane was 12 ml. per hour, the flow rate of tertiary butanol 1.0 ml. per hour, the flow rate of water 18 cc. per hour and 1 liter per hour of nitrogen was passed and the mixed gas was contacted with said catalyst. The duration of reaction was 100 minutes and the reaction product was passed through cooled carbon tetrachloride, collected through a trap in a Dry Ice-acetone bath and analyzed by gas-chromatography. The obtained isoprene was 7.87 g., the yield of isoprene based on the reacted metadioxane was 93.4% and 95% of tertiary butanol was recovered as isobutene.

On the other hand, when the reaction was performed under the same conditions without adding tertiary butanol, the yield of isoprene based on the reacted metadioxane was 88.4%.

Example 2

10 ml. of commercial solid phosphoric acid catalyst treated at 700° C. for 16 hours was filled in an iron reaction tube in a silicon oil bath and the catalytic decomposition of 4,4-dimethylmetadioxane containing a small amount of isoprene glycol was carried out at the reaction temperature of 200° C.

The flow rate of metadioxane was 12.0 ml. per hour, the flow rate of tertiary butanol 3.0 ml. per hour, the flow rate of isoprene glycol 0.5 ml. per hour, the flow rate of water 18 ml. per hour and 1 liter per hour of nitrogen was passed as a carrier gas. The mixed gas was reacted and the reaction product was collected and analyzed in the same manner as in Example 1. As a result, the yield of isoprene was 88.2% based on the reacted metadioxane and isoprene glycol and 94% of tertiary butanol was recovered as isobutene. The yield of isoprene based on metadioxane was 80.5% without adding tertiary butanol.

What I claim is:
1. In the process for the manufacture of isoprene and isobutene in the gaseous phase wherein steam and 4,4-dimethylmetadioxane are passed over a catalyst at elevated temperatures to decompose the dioxane into isoprene and isobutene, the improvement comprising introducing tertiary butanol with the reactants thereby increasing the yield of the isoprene, depressing the formation of isobutene resulting from the catalytic decomposition of the dioxane and at the same time converting the tertiary butanol into isobutene by dehydration.

2. A process according to claim 1 in which the catalyst is a catalyst prepared by treating a solid phosphoric acid catalyst at a temperature above 700° C.

3. A process according to claim 1 in which the molar ratio of the steam to the dioxane is 2:1 to 20:1.

4. A process according to claim 1 in which the tertiary butanol is used in a range of 1 to 70 percent based on the dioxane.

5. A process according to claim 1 in which the reaction temperature is between 105° C. and 400° C.

References Cited by the Examiner
UNITED STATES PATENTS

| | | | |
|---|---|---|---|
| 3,056,845 | 10/1962 | Bennett et al. | 260—681 |
| 3,057,923 | 10/1962 | Hellin et al. | 260—681 |
| 3,105,857 | 10/1963 | Ackermann | 260—681 |
| 3,142,712 | 7/1964 | Valet et al. | 260—681 |
| 3,221,075 | 11/1965 | Hamamoto et al. | 260—681 |

DELBERT E. GANTZ, *Primary Examiner.*

G. E. SCHMITKONS, *Assistant Examiner.*